(12) United States Patent
Bernardi (10) Patent No.: US 7,810,545 B2
(45) Date of Patent: Oct. 12, 2010

(54) ELONGATED ELEMENT FOR THE FRAME OF A PANEL SYSTEM COMPRISING A FLEXIBLE SHEET MATERIAL

(75) Inventor: Arrigo Bernardi, Largo Re Umberto, 106, Torino (IT) I-10128

(73) Assignee: Arrigo Bernardi, Turin (IT)

( * ) Notice: Subject to any disclaimer, the term of this patent is extended or adjusted under 35 U.S.C. 154(b) by 148 days.

(21) Appl. No.: 12/034,280

(22) Filed: Feb. 20, 2008

(65) Prior Publication Data

US 2008/0136079 A1 Jun. 12, 2008

Related U.S. Application Data (62) Division of application No. 10/964,763, filed on Oct. 15, 2004, now abandoned.

(30) Foreign Application Priority Data

Oct. 16, 2003 (IT) .......................... TO2003A0812

(51) Int. Cl.
*E06B 3/30* (2006.01)
(52) U.S. Cl. ...................................... 160/328; 160/378
(58) Field of Classification Search .................. 160/371, 160/372.3, 380, 383, 391, 328; 40/603; 52/273, 52/222; 38/102
See application file for complete search history.

(56) References Cited

U.S. PATENT DOCUMENTS

| 2,218,451 | A |   | 10/1940 | Heyne |         |
|-----------|---|---|---------|---------|---------|
| 2,894,455 | A |   | 7/1959  | Lambert |         |
| 3,482,343 | A | * | 12/1969 | Hamu    | 38/102.5 |
| 3,553,862 | A | * | 1/1971  | Hamu    | 38/102.1 |
| 3,788,216 | A | * | 1/1974  | Lambert | 101/127.1 |
| 3,978,905 | A |   | 9/1976  | De Lama et al. |  |
| 4,817,317 | A |   | 4/1989  | Kovalak, Jr. |   |
| 5,140,765 | A |   | 8/1992  | King    |         |
| 6,125,910 | A |   | 10/2000 | Pepperell et al. |  |
| 6,782,646 | B1 | * | 8/2004 | Devaney | 40/590 |

* cited by examiner

*Primary Examiner*—Blair M. Johnson
(74) *Attorney, Agent, or Firm*—Sughrue Mion, PLLC (57) ABSTRACT

An elongated element for the frame of a panel system comprising a flexible sheet material includes a main profile to which an auxiliary profile is associated. The auxiliary profile is provided with means for anchoring an edge of the sheet material and it can be moved with respect to the main profile as a result of the driving of position control screws. The main profile is adapted to be fixed on the surface of a wall by connection means engaging a connection portion associated to it. The position control screws have a control formation which can be reached from the outside of the frame, when the main profile of the elongated element is fixed to a wall and the sheet material is anchored to the auxiliary profile.

19 Claims, 10 Drawing Sheets

ELONGATED ELEMENT FOR THE FRAME OF A PANEL SYSTEM COMPRISING A FLEXIBLE SHEET MATERIAL

BACKGROUND OF THE INVENTION

This application is a division of U.S. patent application Ser. No. 10/964763, filed Oct. 15, 2004 now abandoned.

The present invention refers in general to frames which can be used for supporting and stretching a flexible sheet material, for the purpose of manufacturing a panel system which can be used to carry out a variety of functions, each of which depends on the type of sheet material used and on the surface to which the sheet material is associated.

In the following description, the term frame is used both to indicate a closed structure consisting of a plurality of elongated elements connected to each other at their ends with the aim of keeping a sheet material stretched, and an open structure including at least an elongated element intended to be associated with an end of the sheet material to be stretched, the opposite end of the sheet material being connected with another elongated element or with a fastening device of a type known per se.

A frame adapted to support and stretch an artistic canvas or similar, is described in the Italian utility model application TO96U000103. It comprises a prismatic-shaped base frame having a peripheral tab which is intended to be surrounded by a sheet material to be stretched. A counter-frame having a shape corresponding to that of the base frame is mounted telescopically so as to be slidable outside of the base frame, and has a peripheral edge for anchoring the edges of the sheet material by means of removable fastening means. Corresponding through openings are formed both in the base frame and in the counter-frame to allow to insert elastic wedges, acting from the inside of the base frame, for changing the position of the counter-frame with respect to the base frame, in order to adjust the tension of the sheet material.

The frame of this document is not much fit to be used with sheet materials of large size, in which case also the base frame and the counter-frame should be very large. However, it is very difficult to assure that an effective mutual sliding may take place between a base frame and a counter-frame having very extended sides and relatively small sections. Moreover, this frame cannot be used to stretch a sheet material if the frame is fixed to a support surface, such as a wall surface, since it would require to operate from the inside of the base frame for changing the tension of the sheet material.

More specifically, the present invention relates to an elongated element.

An elongated element for a frame having the features defined above, is known from the Italian utility model application TO2000U000018. This application describes in particular a frame intended to support a stretched sheet material, such as a fabric, an artistic canvas, paper or similar. The frame consists of a plurality of elongated elements each of which includes a main profile and an auxiliary profile. Each main profile of the frame is rigidly connected to a pair of other main profiles which are arranged perpendicular at its ends. An auxiliary profile is hinged at the back of each main element, which is provided with a free longitudinal end having a tab for allowing an edge of the sheet material to be anchored by removable fastening means. A screw, which can be driven by a tool in order to change its extension between the auxiliary element and the main element, is arranged on each auxiliary element for adjusting the tension of the sheet material, so as to change the angle of the auxiliary profile with respect to the main profile and therefore the distance between the auxiliary profile and the main profile.

The main elements of the frame of this solution have however a structure which is not much fit to be fixed on a support surface, owing to the presence of the auxiliary profiles which are hinged at the back. At any rate, this structure would not allow to obtain in a simple and practical manner the adjustment of the tension of a sheet material supported by the frame when the latter is already fixed on a support surface.

SUMMARY OF THE INVENTION

The main object of the present invention is to provide an elongated element which is particularly adapted to be used for manufacturing a frame for supporting a flexible sheet material of large size, whose elements can be easily fixed to a support surface, such as the wall surface of a room or of a building, and on which the sheet material can be arranged afterwards and stretched with the desired tension without necessarily requiring the removal of the frame from the support surface.

This object is reached by an elongated element having the features mentioned in annexed claim 1.

By virtue of these features, the elongated element of the invention can easily be fixed to a wall surface and possibly connected with other elongated elements, also fixed to the surface of the same wall or to the surface of another wall, in order to form a frame which is able to support the sheet material and which allows to apply to it an even tension as a result of the adjustment of the position of the auxiliary elements of the elongated elements.

In particular, such a frame and a flexible sheet material stretched on it make it possible to manufacture a panel system which can be used for carrying out a variety of functions, depending on the sheet material used. The system can allow to protect a wall, for example a sidewall or the ceiling of a room, so as to replace the common wall coatings, if a sheet material is used having resistance properties such as to allow this protecting function to be carried out. The system can also be employed mainly for decorative purposes by using a sheet material already decorated, for example printed, or adapted to be decorated after the installation, such as with the realization of a pictorial work on it. If a material sheet adapted to constitute a screen for projecting lights or images is used, the panel system allows to manufacture a projection screen, for example of the motion picture type. A frame arranged adjacent to a wall, to which is associated a sheet material whose structure has acoustic absorption properties, allows to manufacture a sound absorbent wall. A panel system comprising a single frame or a pair of frames arranged side-by-side, each with the respective sheet material, allows to form a partition wall which can be used to separate to each other two zones of a room. When the sheet material is associated to a surface, it can be, besides the surface of a wall, the surface of a piece of furniture such as the door of a cupboard or a table top. Shelves or similar for supporting objects may be manufactured by means of one or more elongated elements and the appropriate sheet material. If the sheet material is a covering fabric, it can be used for covering the outside of a piece of furniture such as an armchair and to contain the expansion of the padding interposed between the sheet material and a support portion.

At any rate, the elongated elements forming the frame can be arranged so as to follow accurately the perimeter of the surface of a wall, allowing to by-pass possible openings in it, such as doors or windows, or allowing to make accessible systems or accessories associated with the wall, such as sockets or switches.

If the frame has to be fitted to a wall curved or having a variable shape, elongated elements shaped correspondingly to the wall may be used, for example having a curvilinear shape. As an alternative, curvilinear elongated elements may be used in order to shield or differently shape a flat wall.

When the panel system hides from view a wall, the surface of the wall can be left in the coarse condition. Therefore, possible defects or fittings mounted to the wall, such as protruding pipes, external conduits or air inlets, remain hidden.

The flexible sheet material can be easily removed from the frame for maintenance reasons, such as to be washed, or when one desires to replace it. The costs and inconveniences involved by its removal are of course well smaller than those required by the removal of traditional wall coatings, for example made by wallpaper, wood or tiles.

The elongated element of the invention can be used, as an alternative, for manufacturing a frame of a traditional type, that is intended to be hung on a surface after having mounted on it the respective flexible sheet material and after having brought it in the desired stretch condition.

According to an advantageous feature of the invention, the main profile is provided with guide means for guiding the auxiliary profile according to a movement of translation with respect to the main profile, as a result of the driving of said position control means, the guide means being adapted to prevent the separation of the auxiliary profile from the main profile.

By virtue of this feature, the operation of stretching the sheet material on the frame is made easier, in particular when it is fixed on a support wall.

Further characteristics and advantages of the invention will become more clearly evident from the reading of the detailed description which follows, given purely by way of a non limiting example and referred to the attached drawings, in which:

DETAILED DESCRIPTION OF THE INVENTION

With initial reference to FIGS. 1 to 6, an elongated element according to a first embodiment of the invention is indicated 10 as a whole.

Each element 10 comprises a main profile 10a which includes a beam portion 12 having preferably an axial cavity 12a, and from which an elongated laminar appendage 14 extends, which is provided with a free winding end 16 having a rounded shape. The profile 10a is advantageously made in a single piece of plastic or composite material, or of a metal such as aluminium, preferably obtained as a result of an extrusion forming process.

Conveniently, the beam portion 12 has a polygonal section, for example rectangular, the appendage 14 being the prolongation of one of the sides of the portion 12. A connection portion adapted to allow the profile 10a to be fixed to a support surface, is associated to the beam portion 12. This connection portion may have whatever shape depending on the specific connection requirement, and it may consist of any portion of the profile 10a. Preferably, the connection portion has the shape of a rib 18 extending cantilevered from the portion 12 at the opposite portion of the appendage 14, and it will be dealt in a greater detail in the following.

A substantially L-shaped auxiliary profile 20a, mounted so as to be able to be subject to a movement of translation with respect to the main profile 10a, is associated to each main profile 10a. The profile 20a has a primary branch 22 parallel to the elongated appendage 14 of the main profile 10a, and a secondary branch 24 perpendicular to the primary branch 22. The secondary branch 24 is slidably received in an elongated cavity 36 defined by a hook formation 38 which extends from the beam portion 12 towards the elongated appendage 14. In this manner, the movement of translation of the profile 20a is guided as a result of the engagement of its secondary branch 24 in the cavity 36, so that such a movement may take place without any accidental separation of the profile 20a from the profile 10a, the profile 20a being kept in a position close to the profile 10a.

Moreover, the beam portion 12 is provided with a recess 40 facing the side opposite to the elongated appendage 14, which is preferably constituted by a cavity defined by the same hook formation 38. The recess 40 can be snap engaged by a coupling edge 42 having a slanted insertion end, which is part of a framing profile 44 and which can be coupled removably with the main profile 10a. The framing profile 44 has an edge 46 bent at its portion opposite to the coupling edge 42, intended to be arranged in a position close to the winding end 16 of the elongated appendage 14, when the framing profile 44 is coupled with the main profile 10a.

The movement of the profile 20a with respect to the profile 10a can be controlled by position control means including a plurality of screw members 34 each of which comprises a threaded stem engaged in a corresponding threaded hole formed in the primary branch 22. The threaded stem of the screws 34 has a free end abutting against the appendage 14, and the other end provided with a control formation 34a, such as an hexagonal head, which can be engaged by a corresponding driving tool T (see FIG. 1) to cause rotation of the respective screw 34 about its axis, so that the distance between the appendage 14 and the branch 22 of the profile 20a may be changed.

The primary branch 22 of the auxiliary profile 20a is provided with a bent rim 26 for anchoring an edge of a flexible sheet material S by means of one or more removable clip elements 30. The elements 30 are preferably sections of a channel-shaped profile, which are adapted to be snap coupled on the rim 26 with the interposition of an edge portion of the material S.

An elongated element 10 of the type described above can be associated with other elongated elements 10 in order to form a frame with a closed structure, usually of a polygonal shape, with the purpose to support the sheet material S which can be an artistic canvas, a sheet of paper or plastic material or similar, and to allow to apply the desired tension to the material S. When several elongated elements 10 have been connected, their auxiliary profiles 20a remain independent to each other, and their ends remain free with respect to the ends of the profiles 20a of the adjacent elongated elements 10.

The elongated elements 10 which form the frame can be connected to each other using connection elements 50a, 50b (see FIGS. 4 to 6) having a cross sectional shape corresponding to that of the cavity 12a, inserted at the opposite ends of each main profile 10a. The connection elements 50a are rectilinear and allow to join coaxially two elongated elements 10, while the connection elements 50b are angled, for example at 90°, so that they can be used for connecting at an angle two elongated elements 10, preferably after having cut in a corresponding manner, such as according to an angle of 45° in the case of connection of the elongated elements 10 at 90°, the ends of two main profiles 10a to be joined. As an alternative, the connection elements can have a curvilinear shape in order to allow the mutual connection of curvilinear elements or the connection of curvilinear elements with rectilinear elements.

In order to assure a particularly effective connection between a connection element 50a or 50b and the respective main profiles 10a, each connection element 50a, 50b can be provided with transversal through holes 48 for inserting fixing screws 19a, the holes 48 of the angled connection elements 50b being formed according to pairs of holes transversal to each other at each end of the elements 50b, in such a manner that they can be used for connecting the profiles 10a according two different conditions, one of which is illustrated in FIGS. 1 to 6, while the other involves an arrangement of the appendage 14 of the profiles 10a perpendicular to the material S. As an alternative, the holes 48 may be made by a user, for example using a drill, on connection of the profiles 10a. The screws 19a cross also holes 13 formed in opposite sides of the beam portion 12 of the main profile 10a, at a pair of grooves 13a formed on opposite sides of the beam portion 12. Each screw 19a is then tightened using a nut 19b, and both the head of the screw 19a and the nut 19b are received in the grooves 13a of the portion 12, so that they do not protrude outside of the beam portion 12.

The frame made by means of a plurality of elongated elements 10 of the type described above, is particularly adapted to support a sheet material of large size and is intended to be fixed to a support surface, such as the surface of a wall W, for example of a building, or a room. In this case, with particular reference to FIGS. 1 and 2, the profile 10a is arranged on the surface of the wall W so that the rib 18 rests on it, and therefore the rib may be used to fix the profile 10a to the wall W by means of a series of screws 21 (possibly provided with respective screw anchors, not shown). If the wall W is a metallic sheet, magnetic fixing members, which consist for example of small bar-shaped permanent magnets (not illustrated in the figures), can be used as an alternative to the screws 21, which members can be fixed to the side of the profile 10a intended to face the wall W. In the latter case, the magnetic fixing members can be received in respective hollow seats of the profile 10a which are less deep than such members, in order that they can slightly project from the surface of the profile 10a facing the wall W so as to obtain the separation from the wall W of the magnetic fixing members associated to the opposite element 10, as a result of a pressure applied by a user on the outside edge of one of the elongated elements 10 of the frame, as a consequence of a lever effect, which makes easier the operation of separation of the frame from the wall W.

Figure 1:
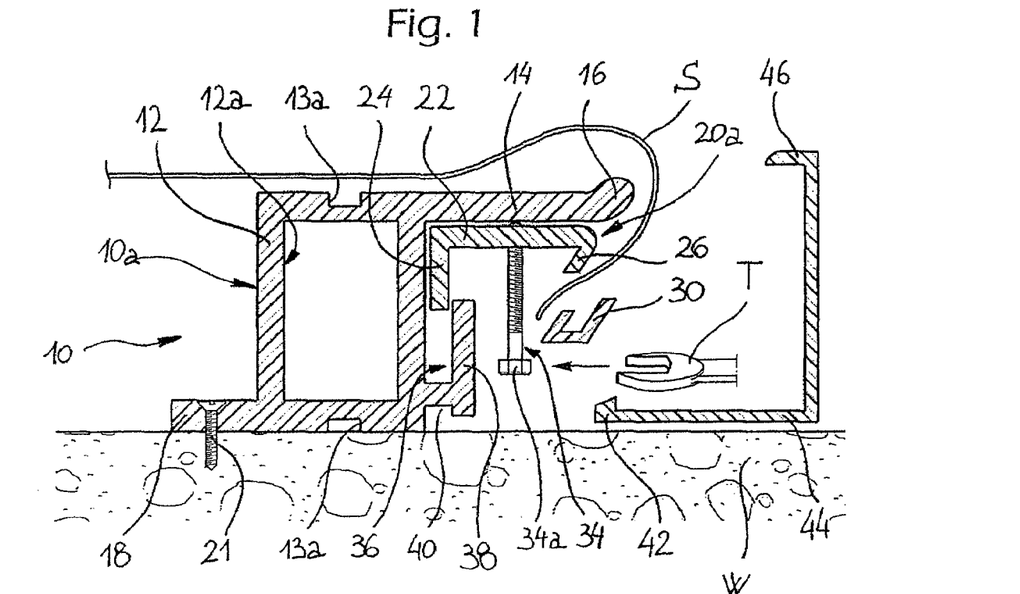
FIG. 1 is a schematic sectional elevational view of an elongated element according to a first embodiment of the invention, which is fixed on a support surface, in the condition preceding the assembly of a sheet material on it.
Figure 2:
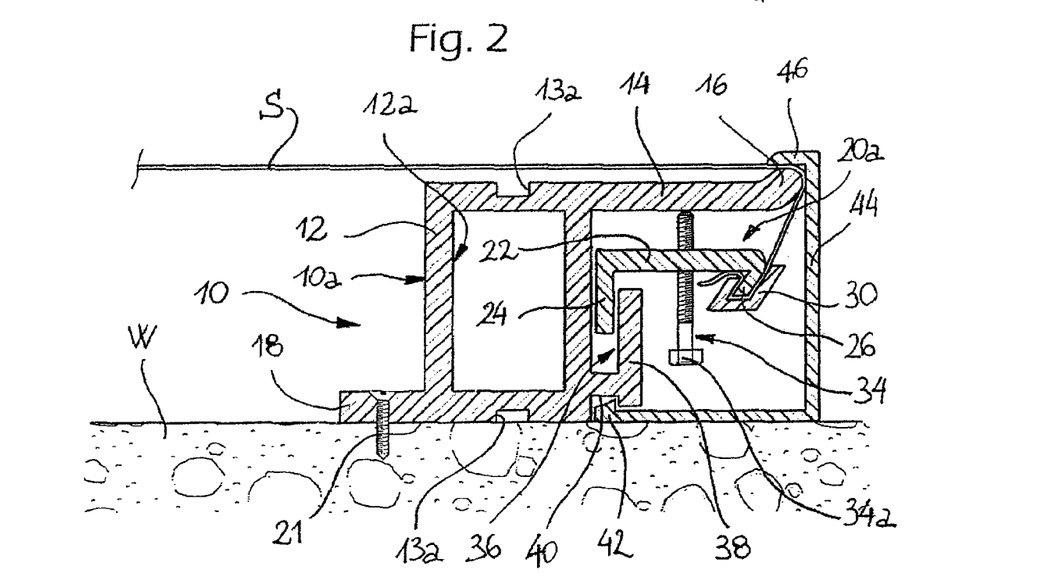
FIG. 2 is a view similar to FIG. 1, showing the same elongated element fully assembled.
Figure 3:
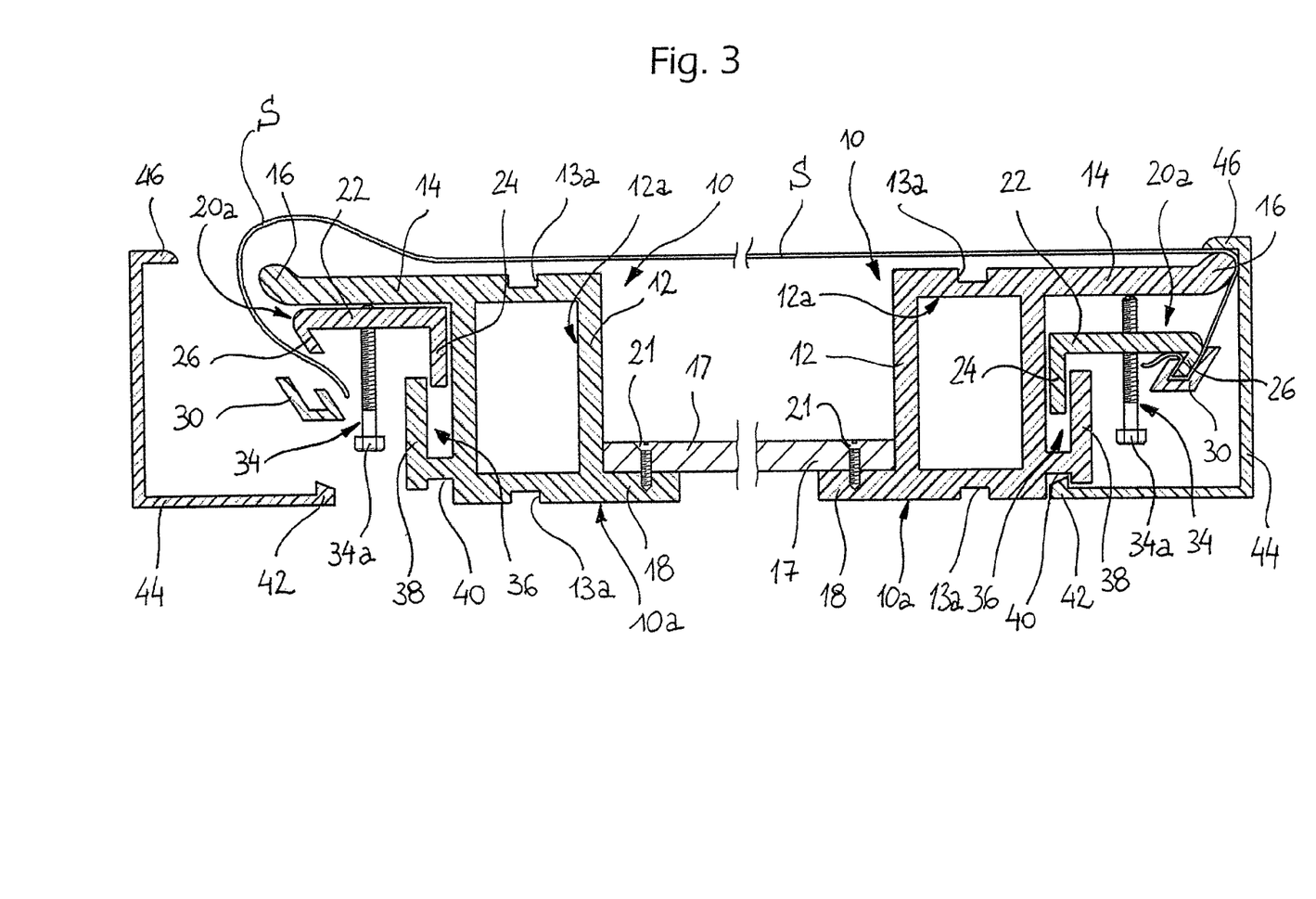
FIG. 3 is a schematic view similar to FIGS. 1 and 2, showing two sectioned elongated elements which are part of a frame according to the invention, which is adapted to be hung on a support surface after having arranged on it a sheet material and having stretched it to the desired tension, the elongated element on the left portion of the figure being in the condition preceding the assembly of the sheet material, while the elongated element on the right portion of the figure is in the condition corresponding to the complete assembly.

After having fixed the several elongated elements 10 which constitute the whole frame, the sheet material S to be supported is superimposed to the frame by resting it on the winding ends 16 of the profiles 10a, so that it assumes a configuration almost parallel to the surface of the wall W. A portion of the material S close to its edges is bent so that it surrounds the winding ends 16 of the respective profiles 10a, and it can be anchored on the bent rim 26 of the auxiliary profiles 20a by means of the clip elements 30.

Using the tool T it is possible to act on the control formations 34a of the screws 34 in order to apply the desired tension to the material S, in particular the appropriate tension to bring the material S in the flat configuration with respect to the frame. It can be noticed that the control formations 34a are arranged in a position which can be easily reached from the outside of the frame when the main profiles 10a thereof are fixed on the rest surface of the wall W and the material S is anchored to the auxiliary profiles 20a.

When the operation of adjusting the tension of the material S has been completed, a respective framing profile 44 can be applied to each of the main profiles 10a, by applying a pressure to the profile 44 so as to push it until the snap engagement of its end 42 in the recess 40 of the main profile 10a is achieved. In this condition, the edge 46 of the profile 44 assumes a position close or resting on the material S which surrounds the winding end 16 of the respective main profile 10a.

As an alternative, a plurality of profiles 10a can be used in order to realize a frame adapted to support a sheet material S extending in a plane perpendicular to the surface of the walls W to which the profiles 10a are fixed. In practice, the profiles 10a of this frame are connected to the wall W in the same manner represented in FIGS. 1 and 2, while the material S is directed perpendicular with respect to the direction illustrated in these figures, that is perpendicular to the appendage 14 of the profiles 10a. In this case, the rib 18 may extend from the beam 12 perpendicularly to the appendage 14, for example like a prolongation of the side of the beam 12 opposite to that having the hook formation 38, so that the connection of the main profile 10a to a wall parallel to the material S, and therefore perpendicular to the wall W of FIGS. 1 and 2, is allowed. If, in this context, a framing profile coupled to the profiles 10a is used, it will be only similar to the framing profile 44, being not provided with the bent edge 46.

If a plurality of main profiles 10a are connected to each other, it is also possible to obtain a frame which can be removed from a wall W, that is intended to be hung on the wall W only after that the material S has been positioned on it and has been brought to the desired tension. If the size of the frame requires it, the frame can be stiffened by using reinforcing crosspieces 17 (see FIGS. 3 to 5) which are fixed to the rib 18 of the main profiles 10a by means of screws 21, for example of the self-tapping type, or the magnetic fixing members mentioned above, in the case in which the wall W is a metallic one. If the crosspieces 17 are intended to cross to each other, they could be made by a series of joint elements including cross connections for the intersection zones, or by means of rectilinear elements overlapping at the intersection zones (not shown in the figures, being of a type known per se). Bolts can be used to fix the ends of the crosspieces 17 to the rib 18 of the respective profiles 10a, as an alternative to the common screws 21. In this case, the rib 18 preferably has a longitudinal groove (not shown) constituting a receiving seat for the head of the screw or for the nut of such bolts. Similar bolts can be used to fix the crosspieces 17 at the overlapping intersection or prolongation zones.

Figure 4:
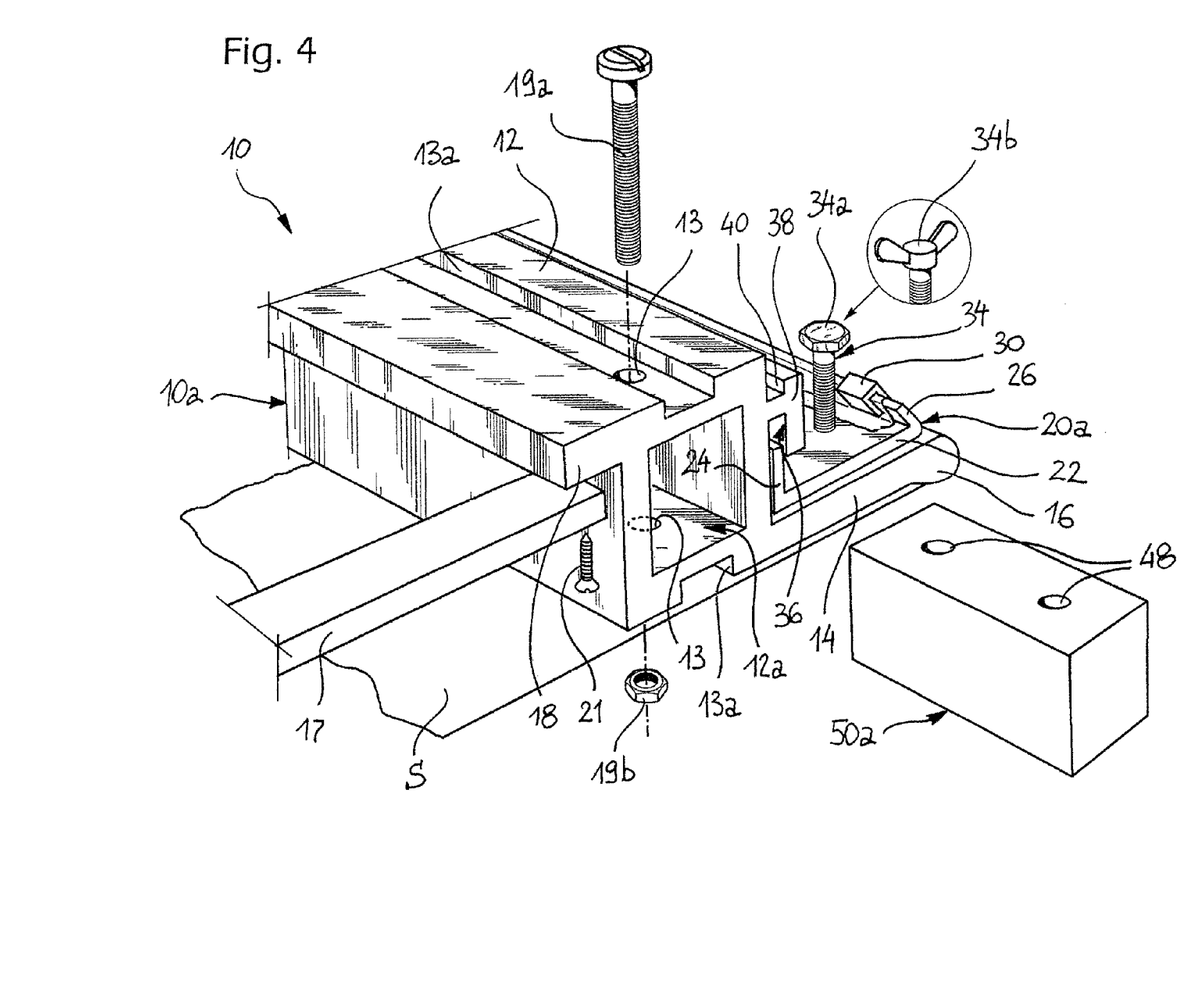
FIG. 4 is a perspective partially exploded view showing an end of the elongated element of FIG. 3 together with a rectilinear connection element which can be inserted in a cavity of the elongated element in order to allow the coaxial connection of two elongated elements.
Figure 5:
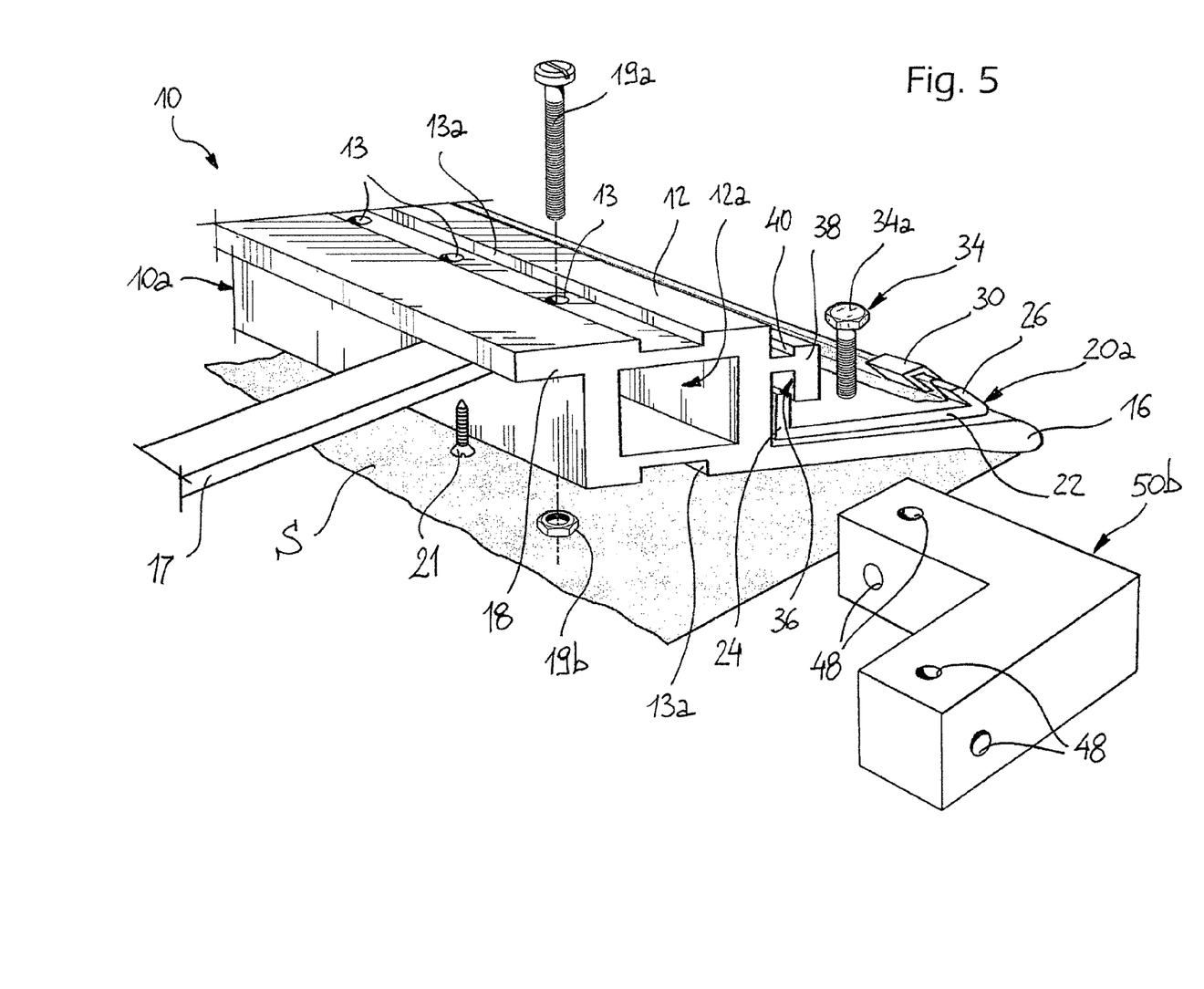
FIG. 5 is a view similar to FIG. 4, showing an elongated element with an end cut at 45° and a connection element with an angle at 90° a branch of which can be inserted in a cavity of the elongated element to allow to connect it perpendicularly with another elongated element.
Figure 6:
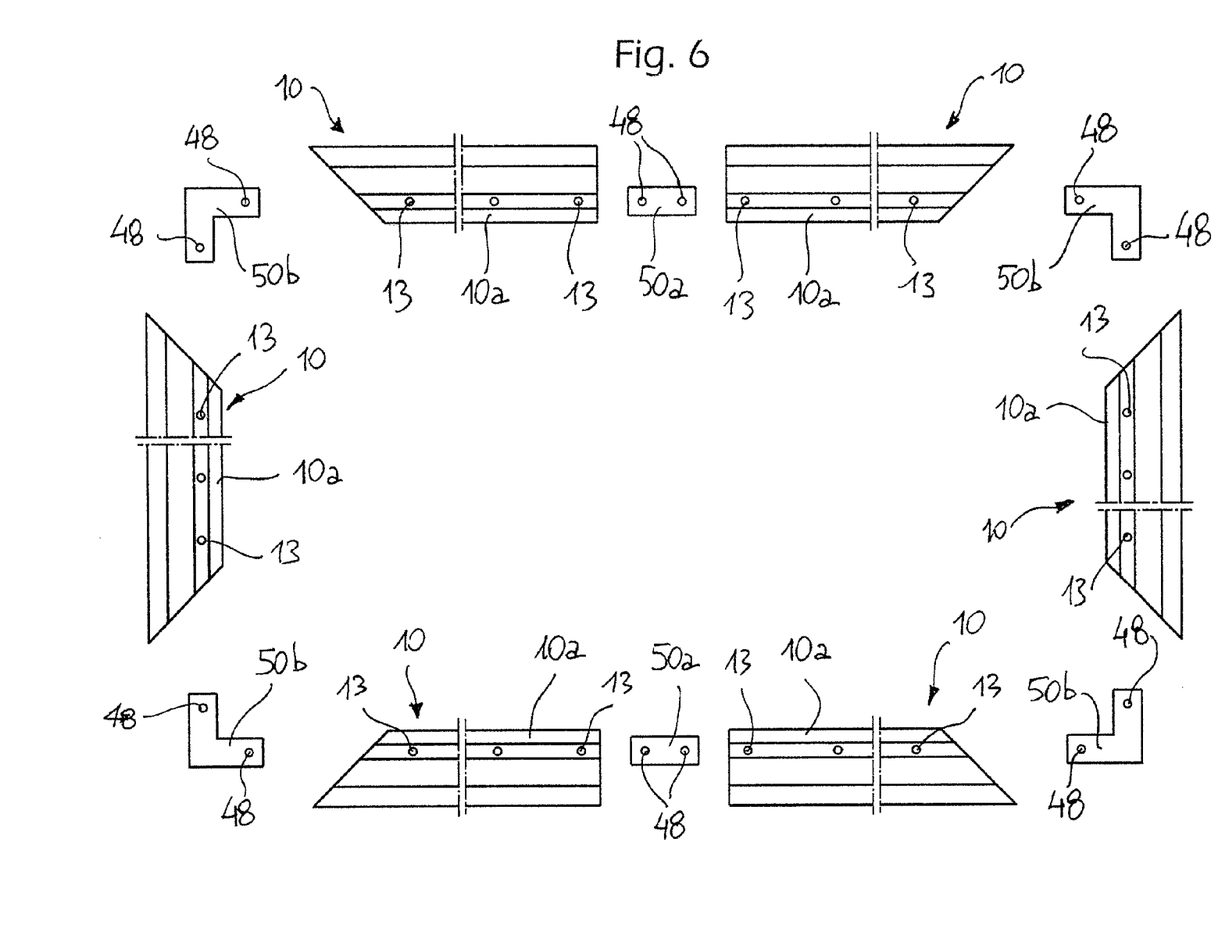
FIG. 6 is an overall schematic view showing a plurality of elongated and connection elements in the exploded condition, which are intended to form a frame according to the invention.

Since with the removable frame it is possible to reach the control formations of the screws 34 from the back of the frame when the latter is separated from the wall W, the formations 34 can be provided with radial fins, indicated 34b in FIG. 4, in order to facilitate their manual driving.

Figure 7:
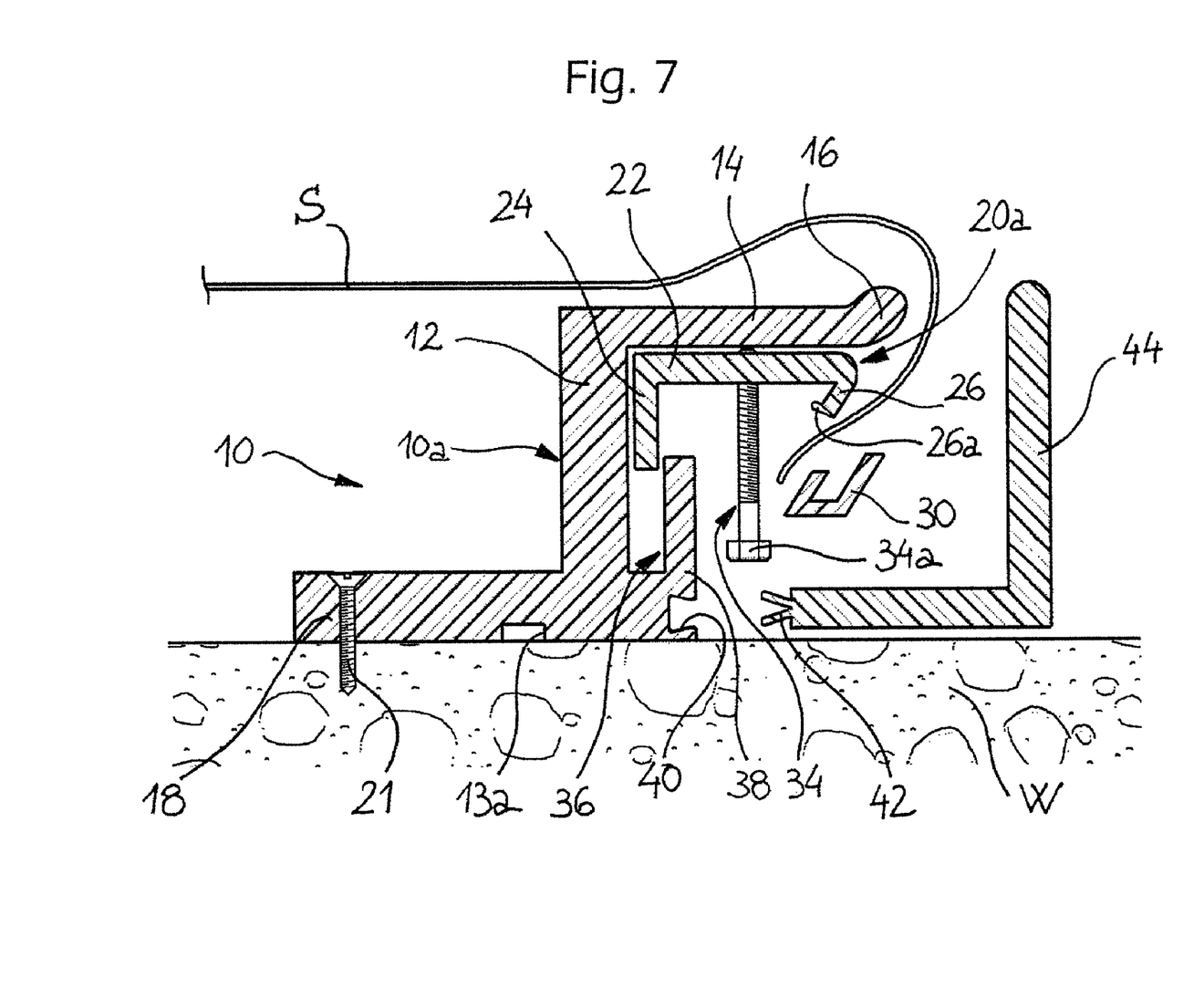
FIG. 7 is a view similar to FIG. 1, of an elongated element according to a second embodiment of the invention.

FIG. 7 shows another embodiment of the invention. In this embodiment, the same numeral references of FIGS. 1 to 6 have been used to indicate elements equal or similar to those of such figures, and mainly the differences with respect to the previously described embodiment will be mentioned in the relevant description. The main profile 10a of this embodiment has a simplified structure in which the beam portion 12 is solid and has a laminar or substantially I-shaped cross-section. Holes intended to be engaged by the screws 21 are formed on the rib 18, and a longitudinal groove 13a is formed on the face opposite to the portion 12. The groove 13a allows to receive the heads of the screws of bolts which can be used for connecting adjacent sections of the profiles 10a to the respective ends by means of rectilinear or angled connection elements (not shown in FIG. 7), in a manner similar to that described with reference to the previous embodiment.

The bent rim 26 of the auxiliary profile 20a may have a check lip 26a, in order to facilitate the coupling of the material S by means of the clip elements 30.

The rib 18 extends from the side opposite to the beam portion 12 in order to form a projection from which extends, parallel to the portion 12, the hook formation 38 which defines the cavity 36. In this projection a mortise 40 having a trapezoid cross-section is formed, in order to allow the front engagement of a tenon 42 extending from an end of a framing profile 44 which has a L-shaped cross-section. The tenon 42 has two elastic tabs arranged according to a V, which are intended to snap engage the mortise 40 as a result of a force applied from the outside on the framing profile 44.

Figure 8:
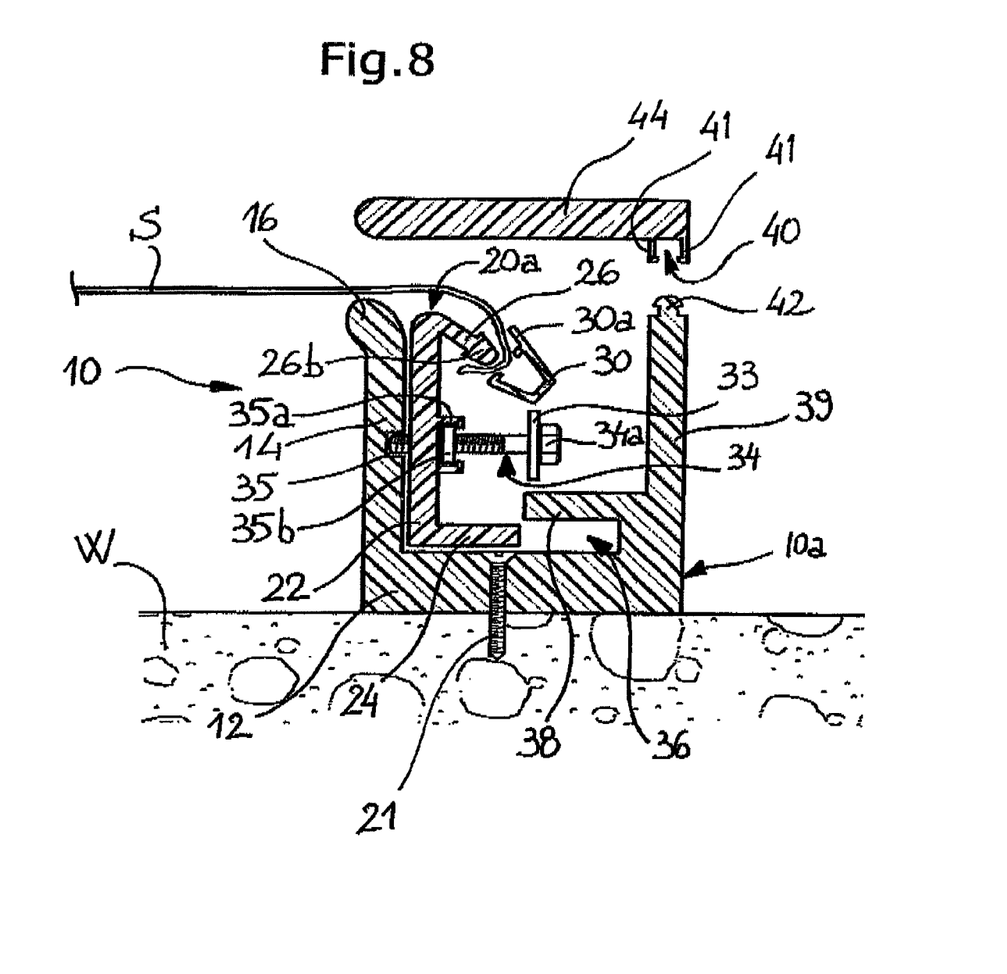
FIGS. 8 and 8a are views similar to FIG. 1, of an elongated element according to a third embodiment of the invention.

FIG. 8 shows another embodiment of an elongated element according to the invention. In this figure, the same numeral references of FIGS. 1 to 7 have been used in order to indicate elements equal or similar to those of such figures. In the following description mainly the aspects of this embodiment will be considered which are different to those already described with reference to the previous embodiments.

Figure 8A:
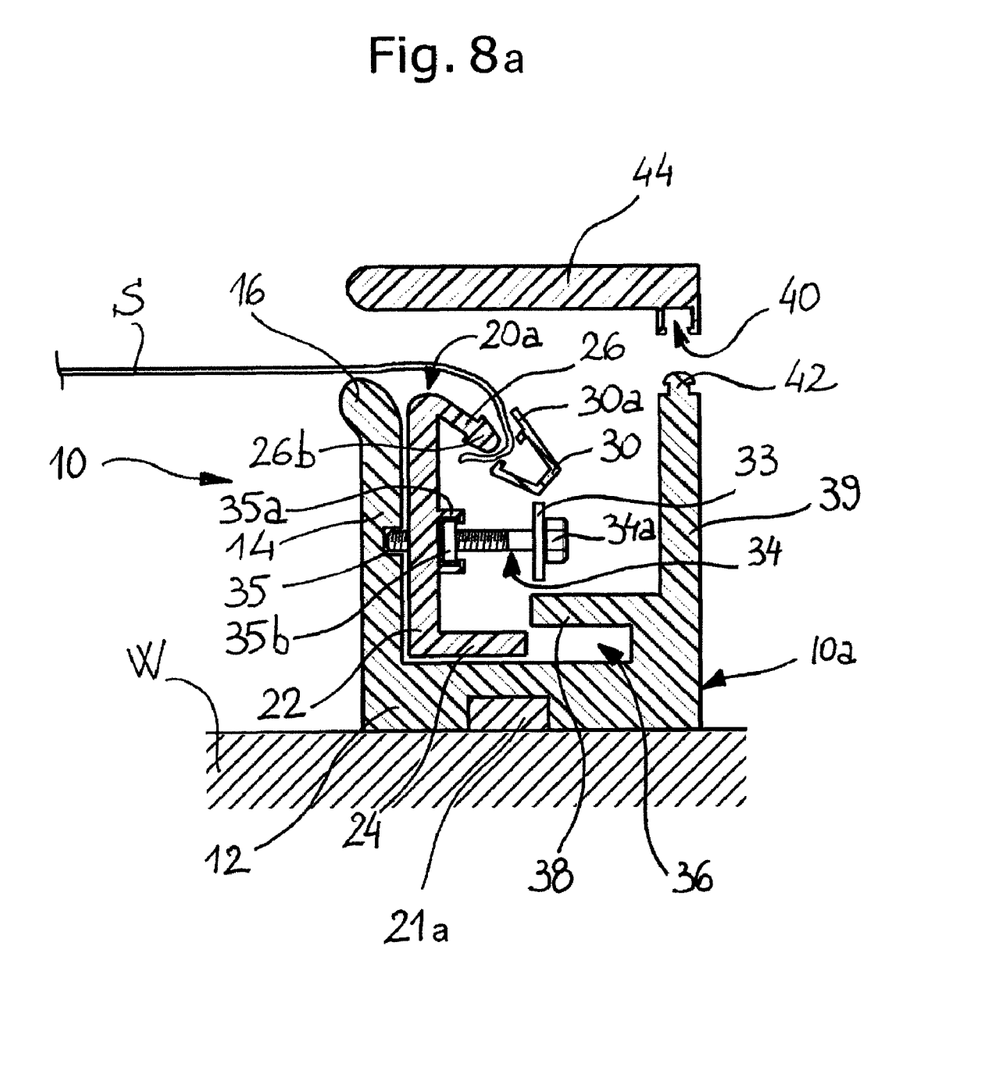

Also the main profile 10a of this embodiment has a simplified structure in which the beam portion 12 is solid and has a laminar cross-section. In this case, one part of the portion 12 constitutes the connection portion of the profile 10a to a wall W, a plurality of holes being formed in it for inserting the respective screws 21 in order to fix the profile 10a to the wall W, or being formed in it seats 21a (See FIG. 8a) for receiving the magnetic fixing members mentioned in the previous embodiment, in the case in which the wall W is metallic.

The means for controlling the position of the auxiliary profile 20a with respect to the main profile 10a, comprise a plurality of screws 34 whose threaded stem crosses the branch 22 of the auxiliary profile 20a and whose free end is received in a groove 35 formed on the face of the appendage 14 facing the profile 20a. The thread of each screw 35 engages the thread of a respective nut 35b, for example a square nut, connected to the branch 22 of the profile 20a by a pair of opposite clip appendages 35a, which are formed integrally with the profile 20a.

The head 34a of each screw 34 preferably has a disc-shaped base portion 33 which makes easier to keep in position a control wrench (not shown in FIG. 8), during the driving of the screws 34.

Conveniently, the bent rim 26 of the auxiliary profile 20a is provided with an enlarged head 26b having a pair of opposite sharp-edge formations intended to snap engage corresponding engagement formations of the respective clip element 30. In order to make easier the removal of the element 30 from the enlarged head 26b, the element 30 is provided with a seizing tongue 30a which can be seized to apply an elastic deformation to the element 30, so as to allow to free from it the sharp-edge formations of the head 26b.

Advantageously, the length of the secondary branch 24 of the auxiliary profile 20a is substantially the same of the distance of the free end of the hook formation 38 from the appendage 14. In this manner, the auxiliary profile 20a can be inserted inside the main profile 10a when the latter has already been fixed to the wall W, by a movement thereof in a direction perpendicular to the wall W. When the branch 24 of the profile 20a rests on the beam portion 12, it is sufficient a small moving away of the profile 20a with respect to the appendage 14, which is obtained by driving the screws 34, to bring the secondary branch 24 into engagement with the elongate cavity 36 of the profile 10a. In such a condition, also by virtue of the simultaneous engagement of the ends of the screws 34 in the groove 35, the auxiliary profile 20a is effectively connected to the main profile 10a and it does not tend to be separated from the beam portion 12 of the main profile 10a not even when it undergoes a high force of traction following to the application of the tension on the sheet material S.

The main profile 10a of this embodiment comprises also a plate portion 39 extending transverse to the hook formation 38 and parallel to the appendage 14. A protrusion 42 having an enlarged head which can be snap engaged in a recess 40 defined by a pair of elastically legs 41 that can be opened, which are formed integrally at an end of a laminar framing profile 44, is provided at the end of the plate portion 39 opposite to the beam portion 12.

Figure 9:
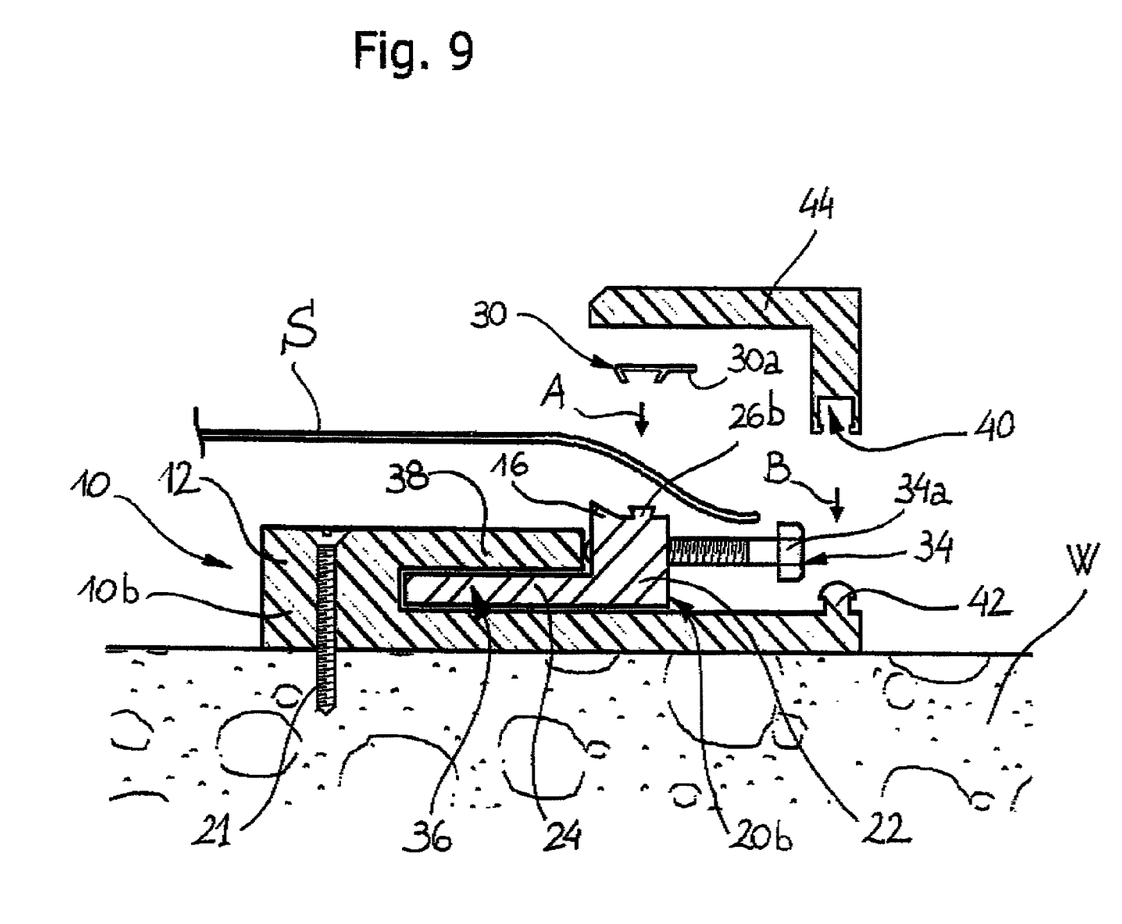
FIG. 9 is a view similar to FIG. 1, of an elongated element according to a fourth embodiment of the invention.

FIG. 9 shows another embodiment of an elongated element according to the invention, which has a further simplified structure. In this figure, the references already used in FIGS. 1 to 8 have been used to indicate elements equal or similar to such figures, and mainly the aspects different from what has been already described with reference to the previous embodiments will be taken in consideration in the relevant description.

The main profile of this embodiment, indicated 10b, has a fork shape with two branches of different length, which extend from a solid beam portion 12. The branch having the greater extension of the two, is intended to be arranged so as to rest on the surface of a support wall W, while the other one, indicated by the reference numeral 38, consists of the hook formation which defines the elongated cavity 36. The beam portion 12 carries out also the function of a portion for connecting the profile 10b and, for this purpose, through holes are formed in it to allow the engagement of a plurality of screws 21 (only one of which can be seen in the figure) to connect the profile 10b to the wall W. As an alternative, seats for receiving the magnetic fixing members mentioned in the previous embodiments, may be formed in the portion 12.

The auxiliary profile 20b associated to the profile 10b has a L-shaped cross-section comprising a primary branch 22 and a secondary branch 24, perpendicular to each other. The branch 24 has a length substantially equal to that of the formation 38 and its cross-section corresponds to that of the cavity 36 so that it can be inserted into the cavity 36. A small play between the cavity 36 and the branch 24 allows the latter to slide along the cavity 36. A winding appendage 16 for the material S and an enlarged head 26b are formed at the end of the primary branch 22 opposite to the branch 24. The enlarged head 26b has a pair of sharp-edges intended to be snap engaged at opposite sides of a corresponding seat of a clip element 30 as a result of a pressure action applied on the element 30, in the direction of the arrow A of such a figure. Conveniently, the clip element 30 is provided with a seizing tongue 30a.

The position of the auxiliary profile 20b with respect to the main profile 10b can be controlled by means of a plurality of screws 34 each of which has a head 34a to be controlled by a tool of corresponding shape. The threaded stem of each screw 34 crosses the branch 22 in such a manner that its free end, opposite to the head 34a, can abut on the respective end face of the hook formation 38.

Moreover, the profile 10b preferably has an enlarged head protrusion 42, at the end of its branch of greater extension, intended to be snap engaged, as a result of the application of a force directed according to arrow B of the figure, in a recess 40 of a framing profile 44 having a L-shaped cross-section, by virtue of the elastic deformation of a pair of parallel legs 41 which define the recess 40.

The portion 12 can be provided with a pair of small parallel appendages of equal extension and hook-shaped (not shown), for example on the face opposite to the cavity 36, which define a seat for receiving connection elements of the main profile 10b, which have a cross-section corresponding to that of such a seat. In particular, rectilinear or curvilinear connection elements can be used to allow a front connection of rectilinear or curvilinear sections of the profile 10b, or angled connection elements in order to connect sections of the profile 10b at an angle, according to a line tilted with respect to the general axis of the profile.

Figure 10:
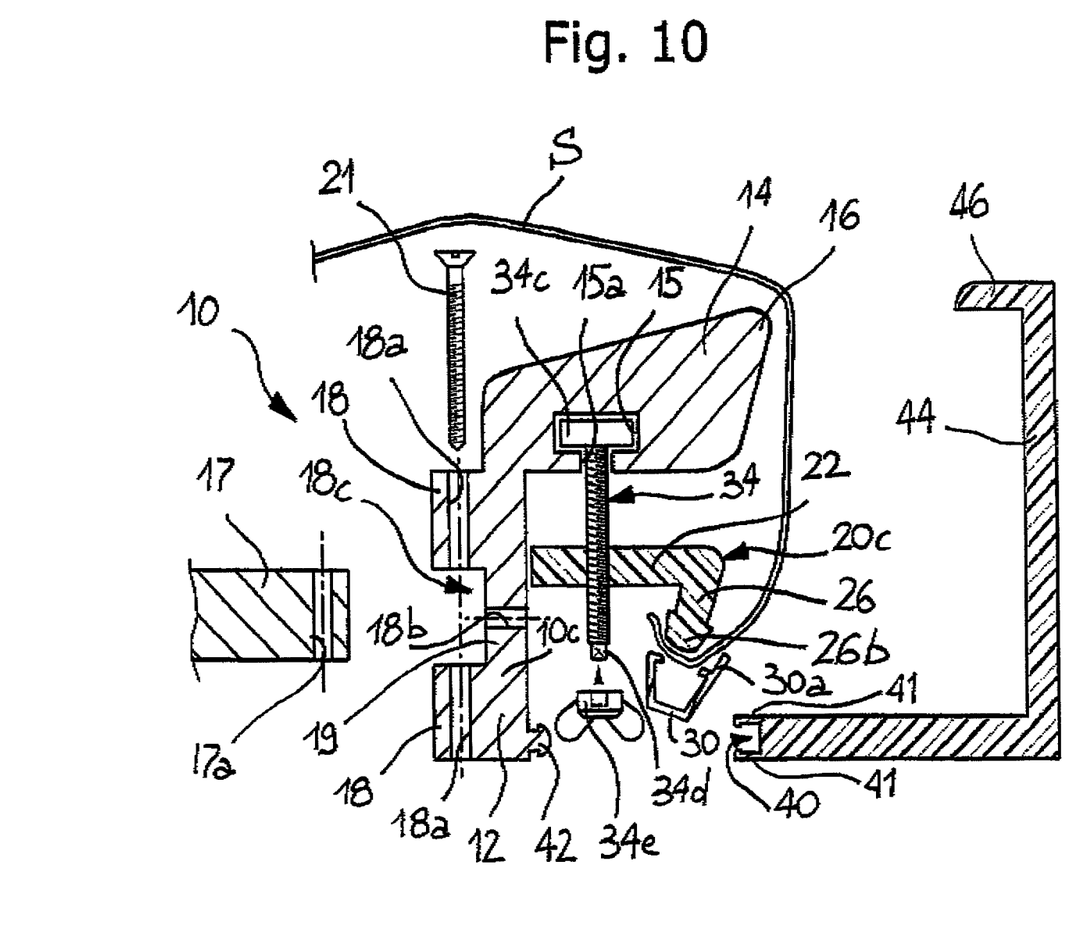
FIG. 10 is a schematic sectioned elevational view of an elongated element according to a fifth embodiment of the invention.

FIG. 10, in which the same references have been used in order to indicate elements equal or similar to those of the previous embodiments, shows an elongated element 10 according to a further embodiment of the invention.

Each elongated element 10 of this embodiment comprises a main profile 10c and an auxiliary profile 20c associated to each other.

The main profile 10c has a beam portion 12 whose cross-section has a substantially opposite C-shape (with reference to the figure) and comprises a pair of parallel ribs 18 both crossed by coaxial holes 18a. An intermediate portion 19 of the portion 12 extends between the two ribs 18. The portion 19 is crossed by holes 18b (only one of which can be seen in FIG. 10), which are perpendicular to the holes 18a and open in a recess 18c.

A screw 21 can be inserted in each pair of coaxial holes 18a of the ribs 18 in order to connect a reinforcing crosspiece 17 to the profile 10c, with the purpose of stiffening the frame if it has to be arranged on a wall subsequently to the stretching of the material S. In this case, the screw 21 engages also a transverse end hole 17a of the reinforcing crosspiece 17, when the corresponding end of the crosspiece 17 is inserted in the recess 18c.

As an alternative, a screw 21 long enough to project outside from the portion 12 (possibly provided with a respective screw anchor, not shown) can be used for each pair of coaxial holes 18a, so as to allow to fix the profile 10c to the surface of a support wall transverse to the screw 21 (not shown). In the latter case, the two ribs 18 carry out the function of a shelf connection portion. As an alternative, the magnetic fixing members mentioned in the previous embodiments can be inserted in the holes 18a, or in an enlarged end portions thereof (not shown).

If, instead, the profile 10c has to be positioned on a wall so that the surface of the wall is parallel to the holes 18a, the ribs 18 are used like support legs of the beam portion 12, and such a portion is fixed to the wall by screws 21 which are inserted in the holes 18b, or by means of magnetic fixing members received in seats formed at the holes 18b or the ribs 18.

The elongated appendage 14 provided with the rounded winding end 16, extends cantilevered sideways from the beam portion 12.

An undercut groove 15 is formed in the appendage 14, which opens on the side of the portion 12 with a narrow groove 15a. The groove 15 is adapted to rotatably receive the enlarged head 34c of the screws 34, so that the threaded stem of the screws 34 projects from the appendage 14 through the groove 15a.

The auxiliary profile 20c associated to the profile 10c has a main laminar branch 22 provided with a bent rim 26 at an end thereof, which is in its turn provided with an enlarged head 26b with opposite sharp-edge formations, in order to allow to fasten to it an edge of the flexible sheet material S by means of clip elements 30.

The stem of each screws 21 engages a corresponding threaded hole formed in the main branch 22 of the auxiliary profile 20c and has, at the opposite end of the respective head 34c, a prismatic formation 34d, for example having a square section, which is intended to engage a corresponding prismatic cavity of a body 34e, preferably provided with radial fins. When the body 34e is fixed to the stem of the respective screw 34, it can be manually driven by a user in order to drive into rotation the respective screw 34, causing therefore a translation of the auxiliary profile 20c so as to move it away or to approach it parallel to the appendage 14, depending on the direction of rotation of the screw 34. When the sheet material S is anchored to the rim 26, the tension applied to the material S is therefore changed as a result of the manual drive of the control formation 34e. By virtue of the fact that the control formations 34e can be easily reached from the outside of the main profiles 10c, the desired tension can be applied to the material S in a simple and practical manner also when the profiles are fixed to the surface of respective support walls and the material S is anchored to the auxiliary profiles 20c.

The beam portion 12, on the side opposite to the appendage 14, is provided with a projection 42 having an enlarged head which can be snap engaged in a recess 40 defined by a pair of elastically flexible legs 41, which are formed integrally at an end of a substantially L-shaped framing profile 44 having an edge bent on the side opposite to the recess 40. The profile 44 may be coupled to the main profile 10c as a result of the application of a force, once the adjusting operation of the tension of the material S has been accomplished. It can be disassembled from the profile 10c if it is desired to remove the material S or in the case in which its tension has to be adjusted again.

What is claimed is:

1. An elongated element for the frame of a panel system comprising a flexible sheet material, comprising:
   a main profile including a connection portion adapted to be fixed to a support surface through connection means, and further including an elongated appendage extending from the connection portion, the elongated appendage having a winding end adapted to be surrounded by a portion of the sheet material close to an edge thereof;
   an auxiliary profile movably associated within the main profile in order to be translatable with respect thereto, and associated with means for anchoring an edge of the sheet material, the auxiliary profile being substantially L-shaped and having a primary branch adapted to be arranged parallel to the elongated appendage of the main profile, and a secondary branch generally perpendicular to said primary branch; and
   drive means for controlling the position of the auxiliary profile with respect to the main profile and for tensioning said sheet material, which drive means comprise an elongated groove extending axially in a side of the main profile facing the auxiliary profile, at least one screw member arranged so as to cross the primary branch of the auxiliary profile and having a respective free end portion slidably received in said groove, as well as a hook formation in the main profile facing the elongated appendage and defining an elongated cavity parallel to the elongated groove and opposite thereto with respect to the auxiliary profile, in which cavity the secondary branch of the auxiliary profile is slidably received, the length of the secondary branch of the auxiliary profile being substantially equal or less than the distance between the hook formation and the elongated appendage so that the auxiliary profile can be inserted in place into the main profile according to a translational movement parallel to said elongated appendage,
   whereby when the sheet material is anchored to the auxiliary profile and said at least one screw member is operated for tensioning the sheet material, separation of the auxiliary profile from the main profile is prevented by virtue of the engagement of said free end portion of said at least one screw member in said elongated groove and of the engagement of the secondary branch of the auxiliary profile in said elongated cavity.

2. An element according to claim 1, wherein a thread of the stem of said screw members engages a thread of a respective nut disengageably associated with the auxiliary profile.

3. An element according to claims 1, wherein the primary branch of the auxiliary profile has means for anchoring an edge of the sheet material through at least a removable clip element.

4. An element according to claim 3, wherein said anchorage means include a bent rim extending from the auxiliary profile.

5. An element according to claim 4, wherein the anchorage means comprise an enlarged head provided with opposite sharp-edge formations intended to be snap engaged by corresponding formations of said clip element.

6. An element according to claim 5, wherein the clip element is provided with a seizing lip in order to make easier the manual grasping thereof.

7. An element according to claim 1, wherein the threaded stem of said screw members engages a corresponding threaded hole associated with the auxiliary profile, whereby the distance between the auxiliary profile and the respective main profile can be adjusted as a result of the rotation of said screw members about their axis, in order to change the tension of the sheet material supported by the frame.

8. An element according to claim 7, wherein the control formation of the screw members can be driven by a driving tool, and in that such a control formation has a disc-shaped base portion for helping to keep said driving tool in its own position when such screw members are driven.

9. An element according to claim 1, wherein said connection portion of the main profile has at least a hole for receiving a respective screw to fix the main profile to a support surface.

10. An element according to claim 1, wherein the connection means for fixing the main profile include magnetic fixing members, which allow the main profile to be fixed to a metallic surface, said magnetic fixing members being arranged in seats formed in the connection portion of the main profile.

11. An element according to claim 1, wherein a rib, which is adapted to fix the main profile to a support surface by said connection means, or which is adapted to fix reinforcing crosspieces of the frame, extends from the main profile.

12. An element according to claim 1, wherein said main profile has a plate portion parallel to said elongate appendage and transverse to said hook formation, the element comprising a framing profile associated with said plate portion by fastening means.

13. An element according to claim 12, wherein said fastening means are snap fastening means which include a first connection portion and a second connection portion and adapted to be snap mutually engaged, respectively formed in the plate portion and in the framing profile.

14. An element according to claim 1, wherein, connection elements are provided for connecting a plurality of adjacent maim. profiles at the respective ends.

15. An element according to claim 14, wherein the main profile has, at its axial ends, seats for receiving rectilinear, angled, or curvilinear connection elements, which have a cross-section corresponding to that of said seat.

16. An element according to claim 15, wherein said receiving seats are defined by an axial cavity of the main profile.

17. An element according to claim 16, wherein the main profile has engagement formations for allowing the heads of screws for fixing said connection elements to be received.

18. An element according to claim 1, wherein the frame of the panel system has main and auxiliary profiles shaped and arranged so as to surround or, by-passing an opening, particularly of the surface of a wall to which, the panel system can be associated.

19. An element according to claim 1, wherein said winding end has a rounded edge to be surrounded by a portion of the sheet material close to an edge thereof.

* * * * *